United States Patent
Chen et al.

(10) Patent No.: US 11,417,149 B2
(45) Date of Patent: Aug. 16, 2022

(54) FACE RECOGNITION DEVICE AND FACE RECOGNITION METHOD

(71) Applicant: GIGA-BYTE TECHNOLOGY CO., LTD., New Taipei (TW)

(72) Inventors: Kai-Hsun Chen, New Taipei (TW); Pei-Hua Sun, New Taipei (TW); Yen-Yun Chang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 128 days.

(21) Appl. No.: 16/995,838

(22) Filed: Aug. 18, 2020

(65) Prior Publication Data
US 2021/0326580 A1 Oct. 21, 2021

(30) Foreign Application Priority Data
Apr. 17, 2020 (TW) ................ 109112931

(51) Int. Cl.
*G06T 7/90* (2017.01)
*G06V 40/16* (2022.01)
(Continued)

(52) U.S. Cl.
CPC .............. *G06V 40/172* (2022.01); *G06T 7/90* (2017.01); *G06V 40/171* (2022.01); *G06V 40/45* (2022.01);
(Continued)

(58) Field of Classification Search
CPC .... G06V 40/172; G06V 40/171; G06V 40/45; G06V 40/166; G06V 40/16; G06T 7/90;
(Continued)

(56) References Cited

U.S. PATENT DOCUMENTS

| 7,203,346 B2 | 4/2007 | Kim et al. |
| 7,602,942 B2 | 10/2009 | Bazakos et al. |

(Continued)

FOREIGN PATENT DOCUMENTS

| CN | 100449564 | 1/2009 |
| CN | 101404060 | 6/2010 |

(Continued)

OTHER PUBLICATIONS

"Office Action of Taiwan Counterpart Application", dated Sep. 30, 2020, p. 1-p. 13.

(Continued)

*Primary Examiner* — Ali Bayat
(74) *Attorney, Agent, or Firm* — JCIPRNET (57) ABSTRACT

A face recognition device and a face recognition method are provided. The face recognition device includes a camera module, a processor and a memory. The camera module obtains a first image of a recognition target and obtains a second image of the recognition target. The processor analyzes whether the first image meets an image condition to determine whether the recognition target is a real face. The memory stores a face database. When the processor determines that the first image meets the image condition, the processor analyzes a plurality of facial features in the second image, and the processor compares whether the second image matches face registration data in the face database according to the facial features to determine whether the second image passes recognition.

18 Claims, 7 Drawing Sheets

(51) Int. Cl.
*H04N 5/225* (2006.01)
*H04N 9/04* (2006.01)
*G06V 40/40* (2022.01)

(52) U.S. Cl.
CPC ............. *H04N 5/2256* (2013.01); *H04N 9/04* (2013.01); *G06T 2207/10024* (2013.01)

(58) Field of Classification Search
CPC ........ G06T 2207/10024; H04N 5/2256; H04N 9/04
USPC .......................................................... 382/118
See application file for complete search history.

(56) References Cited

U.S. PATENT DOCUMENTS

| 8,582,833 | B2 | 11/2013 | Chung et al. | |
|---|---|---|---|---|
| 10,977,483 | B2* | 4/2021 | Hayase | G06F 21/32 |
| 2010/0128938 | A1* | 5/2010 | Chung | G06V 10/143 |
| | | | | 382/117 |
| 2010/0134250 | A1* | 6/2010 | Chung | G06V 40/40 |
| | | | | 340/5.86 |
| 2014/0266604 | A1* | 9/2014 | Masood | G06Q 10/06 |
| | | | | 340/5.83 |
| 2018/0007431 | A1* | 1/2018 | Sidhu | H04N 21/25883 |
| 2021/0161193 | A1* | 6/2021 | Dumm | G06T 7/62 |

FOREIGN PATENT DOCUMENTS

| CN | 101964056 | 6/2012 |
|---|---|---|
| CN | 102622588 | 10/2013 |
| CN | 103514438 | 1/2014 |
| CN | 109635770 | 4/2019 |
| CN | 105912986 | 6/2019 |
| JP | 2008181468 | 8/2008 |
| JP | 2019506694 | 3/2019 |
| JP | 2019159982 | 9/2019 |

OTHER PUBLICATIONS

"Search Report of Europe Counterpart Application", dated Feb. 26, 2021, p. 1-p. 9.

"Office Action of Japan Counterpart Application", dated Jan. 18, 2022, p. 1-p. 3.

* cited by examiner

FACE RECOGNITION DEVICE AND FACE RECOGNITION METHOD

CROSS-REFERENCE TO RELATED APPLICATION

This application claims the priority benefit of Taiwan application no. 109112931, filed on Apr. 17, 2020. The entirety of the above-mentioned patent application is hereby incorporated by reference herein and made a part of this specification.

TECHNICAL FIELD

The invention relates to a recognition technology, and more particularly, to a face recognition device and a face recognition method.

BACKGROUND

For current face recognition technology, during the process of using an infrared camera to obtain a face image for recognition, if an unregistered user uses an infrared photo with a registered face image for the infrared camera to capture, the face recognition device will not be able to determine whether a recognition target is a real face or the infrared photo. Consequently, the face recognition device may perform a face recognition based on a captured result of the infrared photo. In other words, the unregistered user can use the infrared photo with the registered face image to crack the face recognition. In the light of this, several solutions are provided in the embodiments below to allow the face recognition to have an anti-cracking mechanism.

SUMMARY

The invention provides a face recognition device and a face recognition method having the anti-cracking mechanism.

The face recognition device of the invention includes a camera module, a processor and a memory. The camera module is configured to obtain a first image of a recognition target and obtain a second image of the recognition target. The processor is coupled to the camera module, and configured to analyze whether the first image meets an image condition to determine whether the recognition target is a real face. The memory is coupled to the processor, and configured to store a face database. When the processor determines that the first image meets the image condition, the processor analyzes a plurality of facial features in the second image, and the processor compares whether the second image matches face registration data in the face database according to the facial features to determine whether the second image passes recognition.

In an embodiment of the invention, the face recognition device further includes an infrared light emitting module. The infrared light emitting module is coupled to the processor. The camera module includes an infrared camera. The infrared camera is configured to non-simultaneously obtain the first image and the second image. When the infrared camera obtains the first image, the infrared light emitting module simultaneously emits a first illumination light to the recognition target. When the infrared camera obtains the second image, the infrared light emitting module simultaneously emits a second illumination light to the recognition target.

In an embodiment of the invention, a brightness of the first illumination light is higher than a brightness of the second illumination light.

In an embodiment of the invention, the image condition includes that when a first facial feature quantity of the first image is less than a first threshold, the processor determines that the first image meets the image condition.

In an embodiment of the invention, the image condition includes that when a first facial feature quantity of the first image and a second facial feature quantity of the second image are different, the processor determines that the first image meets the image condition.

In an embodiment of the invention, the image condition includes that when a first facial feature quantity of the first image is greater than a second threshold, the processor determines that the first image does not meet the image condition.

In an embodiment of the invention, the face recognition device further includes an infrared light emitting module. The infrared light emitting module is coupled to the processor. The camera module includes a color camera and an infrared camera. The color camera is configured to obtain a first image. The infrared camera is configured to obtain a second image. When the infrared camera obtains the second image, the infrared light emitting module simultaneously emits an infrared illumination light to the recognition target.

In an embodiment of the invention, the image condition includes determining whether the first image is a color image.

In an embodiment of the invention, the face recognition device further includes a display. The display is coupled to the processor. The display displays a dynamic image captured by the color camera.

In an embodiment of the invention, the first image and the second image are obtained simultaneously.

The face recognition method of the invention includes the following steps. A first image of a recognition target and a second image of the recognition target are obtained by a camera module. Whether the first image meets an image condition is analyzed to determine whether the recognition target is a real face. When the first image meets the image condition, a plurality of facial features in the second image are analyzed, and whether the second image matches face registration data in a face database is compared according to the facial features to determine whether the second image passes recognition.

Based on the above, the face recognition device and the face recognition method of the invention can capture two face images, determine whether the recognition target is the real face by analyzing the first face image, and then perform the face recognition by using the facial features in the second face image.

To make the aforementioned more comprehensible, several embodiments accompanied with drawings are described in detail as follows.

DETAILED DESCRIPTION

In order to make content of the invention more comprehensible, embodiments are described below as the examples to prove that the invention can actually be realized. Moreover, elements/components/steps with same reference numerals represent same or similar parts in the drawings and embodiments.

Figure 1:
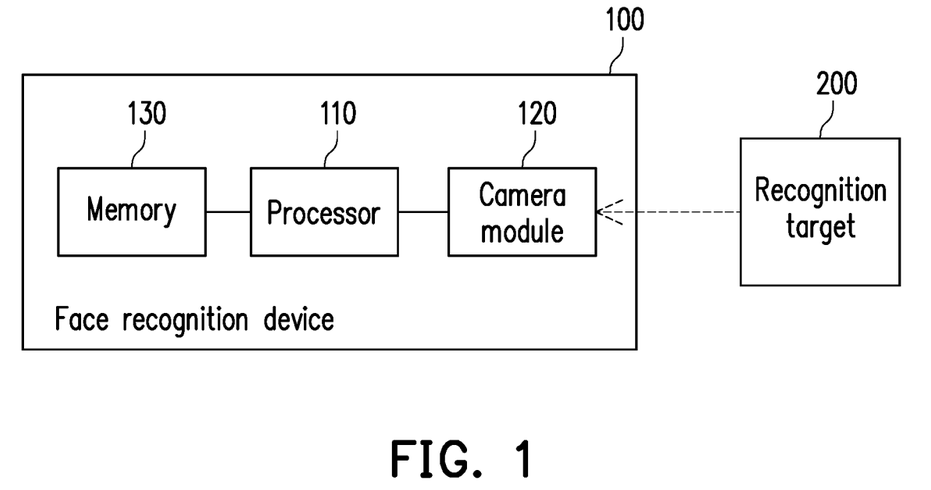
FIG. 1 is a schematic diagram of a face recognition device according to an embodiment of the invention.

FIG. 1 is a schematic diagram of a face recognition device according to an embodiment of the invention. Referring to FIG. 1, a face recognition device 100 includes a processor 110, a camera module 120 and a memory 130. The processor 110 is coupled to the camera module 120 and the memory 130. The memory 130 can store a face database. In this embodiment, the camera module 120 can simultaneously or non-simultaneously obtain a first image and a second image of a recognition target 200. In this embodiment, the processor 110 can analyze whether the first image meets an image condition to determine whether the recognition target 200 is a real face. Further, when the processor 110 determines that the first image meets the image condition, the processor 110 can continue to analyze a plurality of facial features in the second image. The processor 110 can compare whether the second image matches face registration data in the face database according to the facial features to determine whether the second image passes recognition.

In this embodiment, the processor 110 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD), other similar processing devices or a combination of these devices. The memory 130 can further store images captured by the camera module 120, related image analysis programs or face recognition programs, which may be read and executed by the processor 110.

In this embodiment, the camera module 120 may include one or more cameras, and the cameras may be, for example, a color camera (RGB camera) or an infrared camera. In certain embodiments of the invention, the camera module 120 at least includes one infrared camera, which is used to obtain a face image for a face recognition. In this embodiment, the camera module 120 can obtain the first image and the second image at the same time or at relatively close times, and the first image can be used by the processor 110 to determine whether the recognition target 200 is the real face, so as to determine whether to continue using the second image for the face recognition. Specifically, the processor 110 of the present embodiment can preset a specific image condition for determining whether the first image is obtained from the real face. Then, the processor 110 will continue to perform a face feature analysis and recognition only when determining that the first image is the real face. In addition, the image condition described in this embodiment may be, for example, a facial feature quantity or a color degree.

Figure 2:
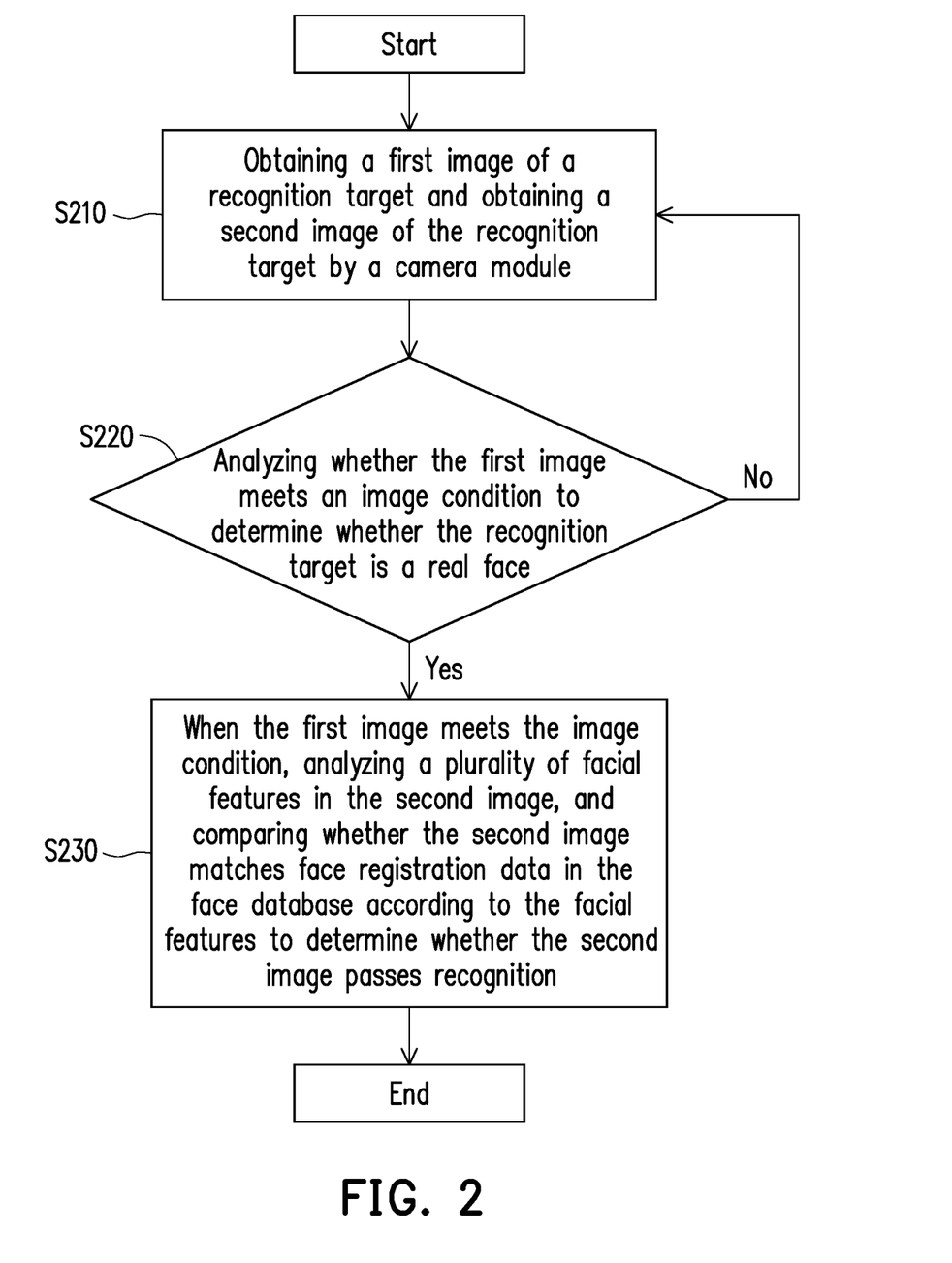
FIG. 2 is a flowchart of a face recognition method according to an embodiment of the invention.

FIG. 2 is a flowchart of a face recognition method according to an embodiment of the invention. Referring to FIG. 1 and FIG. 2, the face recognition method of the present embodiment is adapted to the face recognition device 100 in the embodiment of FIG. 1 for allowing the face recognition device 100 to perform steps S210 to S230. In step S210, the face recognition device 100 obtains the first image of the recognition target 200 and obtains the second image of the recognition target 200 by the camera module 120. In step S220, the processor 110 can analyze whether the first image meets the image condition to determine whether the recognition target 200 is the real face. If not, the processor 110 re-executes step S210 to re-capture the first image and the second image. If yes, the processor 110 executes step S230. In step S230, when the first image meets the image condition, the processor 110 analyzes the facial features in the second image, and the processor 110 compares whether the second image matches the face registration data in the face database according to the facial features to determine whether the second image passes recognition. In this way, the face recognition method of the present embodiment can provide an anti-cracking face recognition function.

Figure 3:
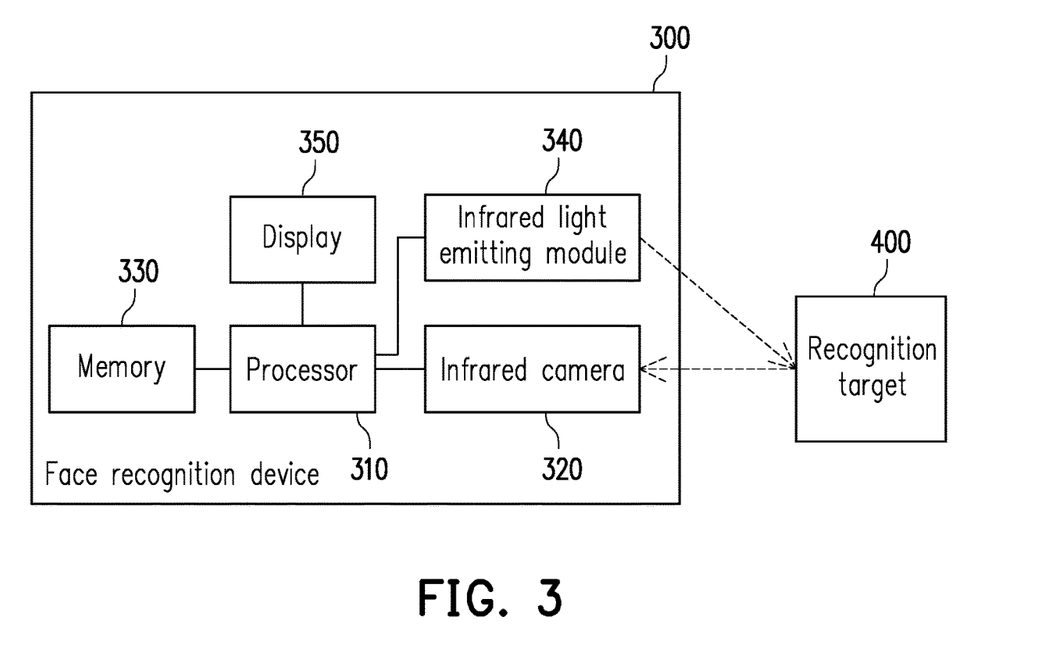
FIG. 3 is a schematic diagram of a face recognition device according to a first embodiment of the invention.
Figure 4:
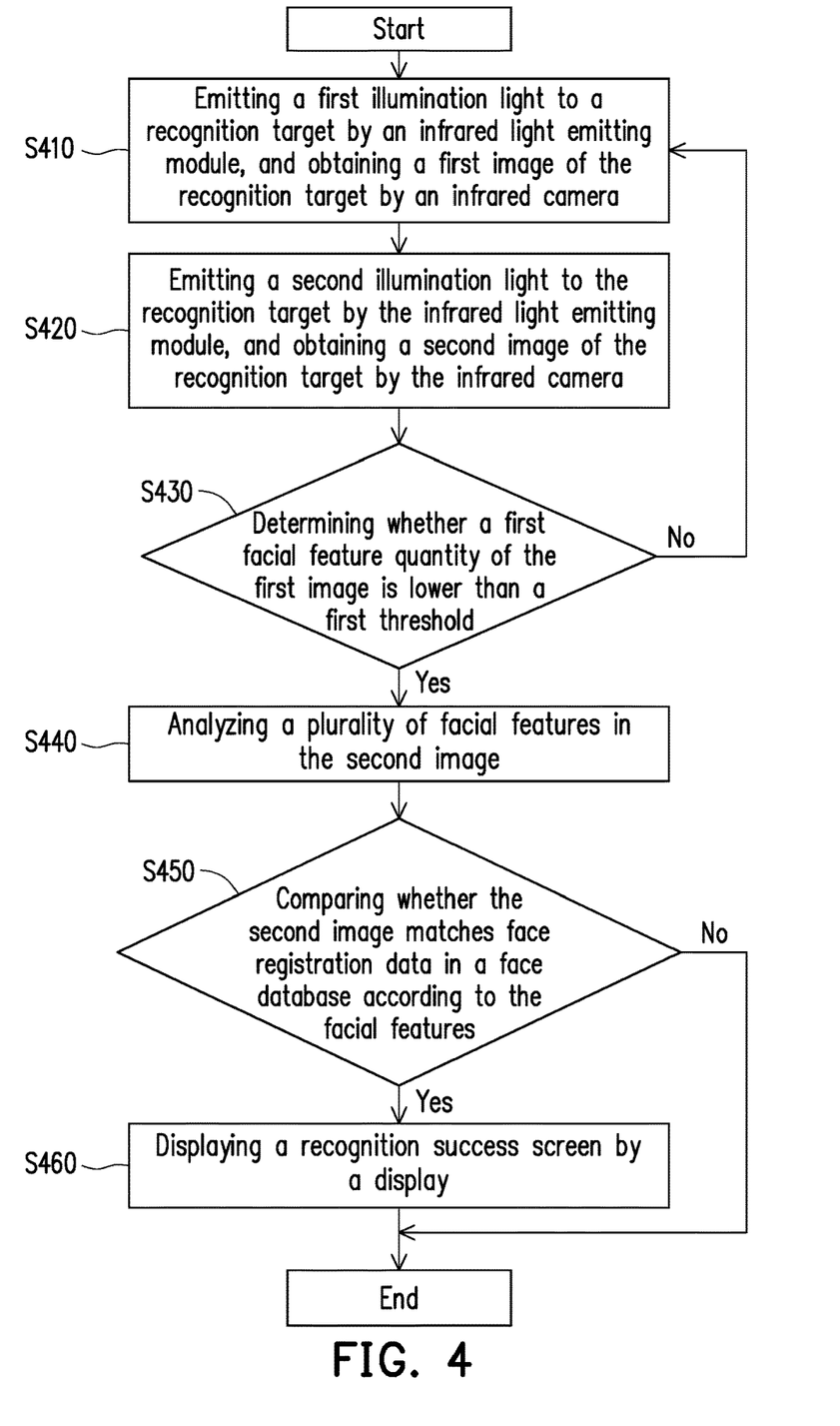
FIG. 4 is a flowchart of a face recognition method according to the first embodiment of the invention.

FIG. 3 is a schematic diagram of a face recognition device according to a first embodiment of the invention. FIG. 4 is a flowchart of a face recognition method according to the first embodiment of the invention. Referring to FIG. 3, a face recognition device 300 includes a processor 310, an infrared camera 320 (i.e., the camera module 120 in the embodiment of FIG. 1 can further include the infrared camera), a memory 330, an infrared light emitting module 340 and a display 350. The processor 310 is coupled to the infrared camera 320, the memory 330, the infrared light emitting module 340 and the display 350. The memory 330 can store a face database. In this embodiment, when the infrared camera 320 captures a recognition target 400 to obtain a first image, the infrared light emitting module 340 can simultaneously emit a first illumination light to the recognition target 400 to illuminate the recognition target 400. Also, when the infrared camera 320 captures the recognition target 400 to obtain a second image, the infrared light emitting module 340 can simultaneously emit a second illumination light to the recognition target 400 to illuminate the recognition target 400. In other words, the infrared camera 320 of this embodiment can obtain two images with different brightnesses (or exposure degrees) at different times. However, the invention does not limit the order of obtaining the first image and the second image.

Referring to FIG. 3 and FIG. 4 together, the face recognition device 300 of FIG. 3 can realize an anti-cracking face recognition function by executing steps S410 to S460 of FIG. 4. In step S410, the face recognition device 300 can emit the first illumination light to the recognition target 400 by the infrared light emitting module 340, and obtain the first image of the recognition target 400 by the infrared camera 320. In step S420, the face recognition device 300 can emit the second illumination light to the recognition target 400 by the infrared light emitting module 340, and obtain the second image of the recognition target 400 by the infrared camera 320. It is worth noting that the order of executing steps S410 and S420 can be changed, and is not limited to the order of FIG. 4. Further, in this embodiment, a brightness of the first illumination light used by the infrared light emitting module 340 for illuminating the recognition target 400 is higher than a brightness of the second illumination light. The infrared light emitting module 340 can provide the first illumination light and the second illumination light respectively by using two light emitting units, or provide the first illumination light and the second illumination light by adjusting a brightness setup of the same light emitting unit.

Figure 5A:
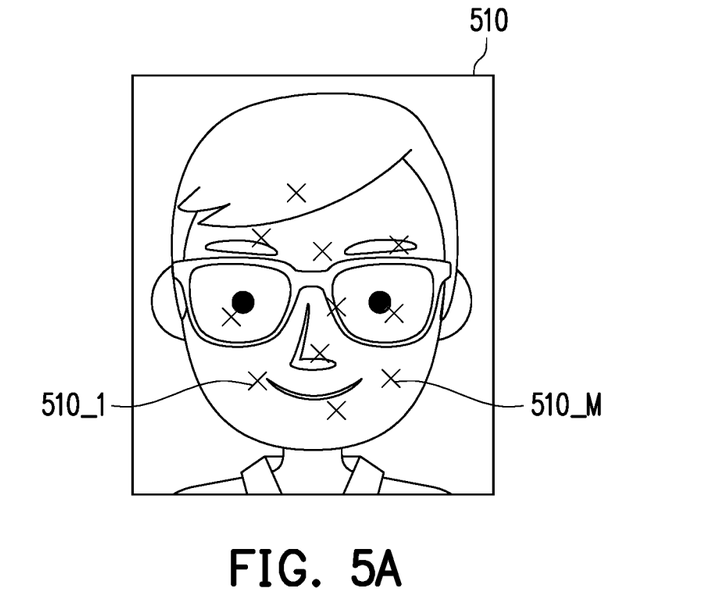
FIG. 5A is a schematic diagram of an image generated by capturing a face photo according to an embodiment of the invention.
Figure 5B:
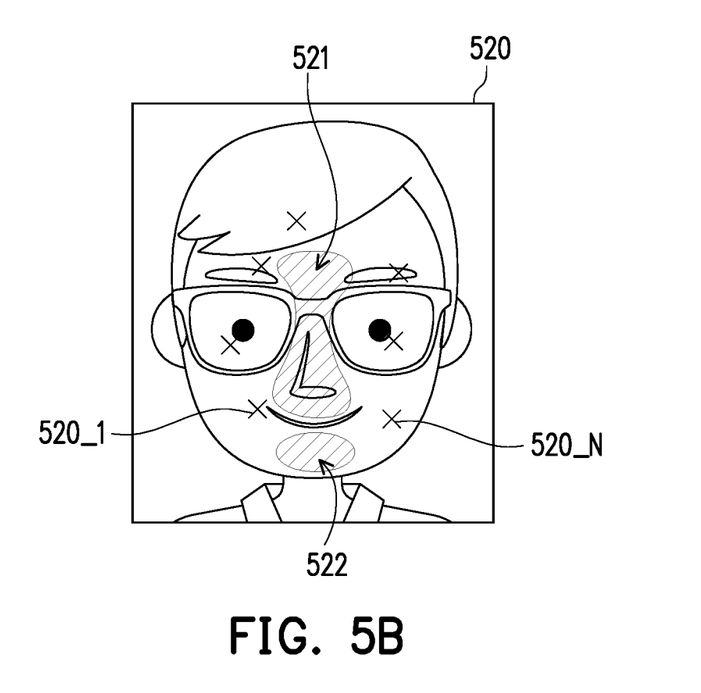
FIG. 5B is a schematic diagram of an image generated by capturing a real face according to an embodiment of the invention.

FIG. 5A is a schematic diagram of an image generated by capturing a face photo according to an embodiment of the invention. FIG. 5B is a schematic diagram of an image generated by capturing a real face according to an embodiment of the invention. Referring first to FIG. 5A and FIG. 5B, it should be noted that if the recognition target 400 is an infrared photo instead of the real face, even though the infrared photo is illuminated by high brightness infrared, the first image obtained by the infrared camera 320 is not prone to or will not have over-exposure caused by high brightness infrared illumination, and will show an image 510 shown in FIG. 5A (i.e., close to the original infrared photo). The image 510 includes a plurality of facial features 510_1 to 510_M, and M is a positive integer.

Conversely, if the recognition target 400 is the real face, after the real face is irradiated by high brightness infrared illumination, there can be over-exposure on certain areas of the real face, as shown by an image 520 shown in FIG. 5B. The image 520 includes a plurality of facial features 520_1 to 520_N, and N is a positive integer. In addition, a face image in the image 520 also includes overexposed areas 521 and 522. Because the facial features overlapping with the overexposed areas 521 and 522 will be covered by the overexposed areas 521 and 522 and cannot be recognized by the processor 310, a facial feature quantity in the image 520 generated by capturing the real face will be less than a facial feature quantity on the real face and less than a facial feature quantity of the image 510 generated by capturing the face photo (N<M).

Referring to FIG. 3 and FIG. 4, in step S430, the processor 310 can determine whether a first facial feature quantity of the first image is lower than a first threshold to determine whether the recognition target 400 is the real face. If not, it means that the recognition target 400 is not the real face, so the processor 310 re-executes step S410. If yes, it means that the recognition target 400 is the real face, so the processor 310 executes step S440. In step S440, the processor 310 analyzes the facial features in the second image to obtain a plurality of feature values of the facial features. In step S450, the processor 310 compares whether the second image matches the face registration data in the face database according to the feature values of the facial features, wherein the face database is stored in the memory 330 and read and executed by the processor 310. If not, the processor 310 ends the face recognition or re-executes step S410. If yes, the processor 310 executes step S460. In step S460, the display 350 can display a recognition success screen. Therefore, the face recognition device 300 and the face recognition method of this embodiment can effectively prevent others from cheating the processor 310 and passing verification of the face recognition by using the infrared photo instead of the real face for the infrared camera 320 to capture.

However, the image condition used by the processor 310 for determining whether the recognition target 400 is the real face is not limited to step S430 above. In one embodiment, the processor 310 can determine whether the recognition target 400 is the real face by determining whether the first facial feature quantity of the first image and a second facial feature quantity of the second image are different. In this regard, when the first facial feature quantity of the first image and the second facial feature quantity of the second image are different, it indicates that the first image has an image over-exposure, and thus the processor 310 can determine that the recognition target 400 is the real face. Conversely, when the first facial feature quantity of the first image and the second facial feature quantity of the second image are the same, it indicates that the first image does not have the image over-exposure, and thus the processor 310 can determine that the recognition target 400 is not the real face (may be the infrared photo).

In another embodiment, the processor 310 can determine whether the recognition target 400 is the real face by determining whether the first facial feature quantity of the first image is greater than a second threshold. In this regard, when the first facial feature quantity of the first image is greater than the second threshold, it indicates that the first image does not have the image over-exposure, and thus the processor 310 can determine that the recognition target 400 is not the real face (may be the infrared photo). Conversely, when the first facial feature quantity of the first image is not greater than the second threshold, it indicates that the first image has the image over-exposure, and thus the processor 310 can determine that the recognition target 400 is the real face. It should be noted that, in yet another embodiment, the processor 310 can also determine whether the recognition target 400 is the real face more rigorously by determining whether at least two of the three image conditions described above are met at the same time.

Figure 6:
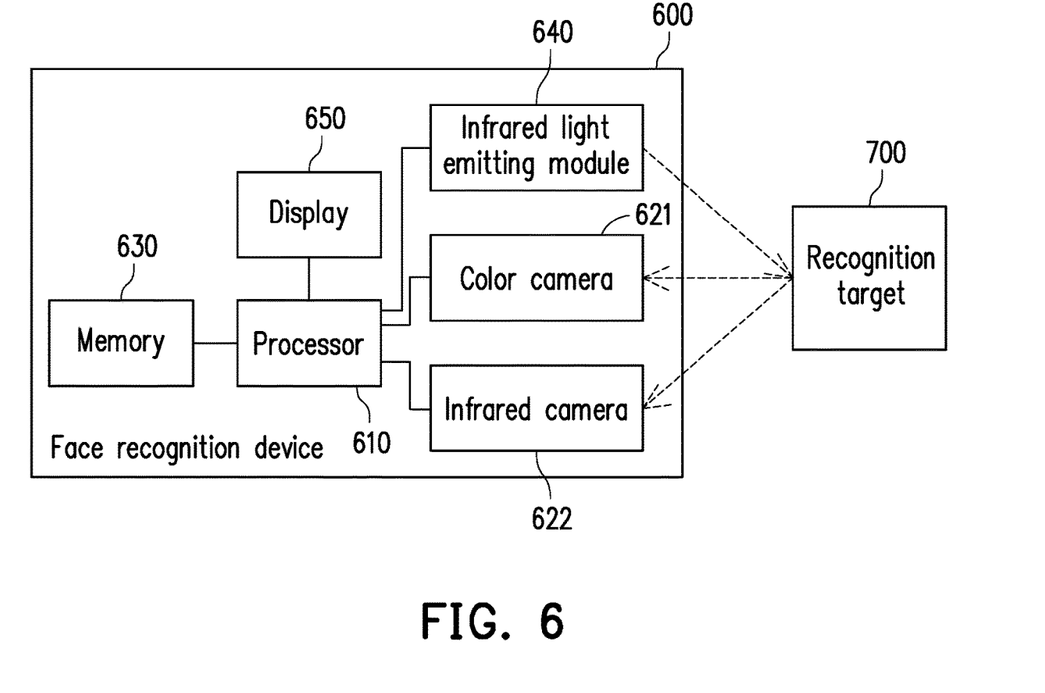
FIG. 6 is a schematic diagram of a face recognition device according to a second embodiment of the invention.
Figure 7:
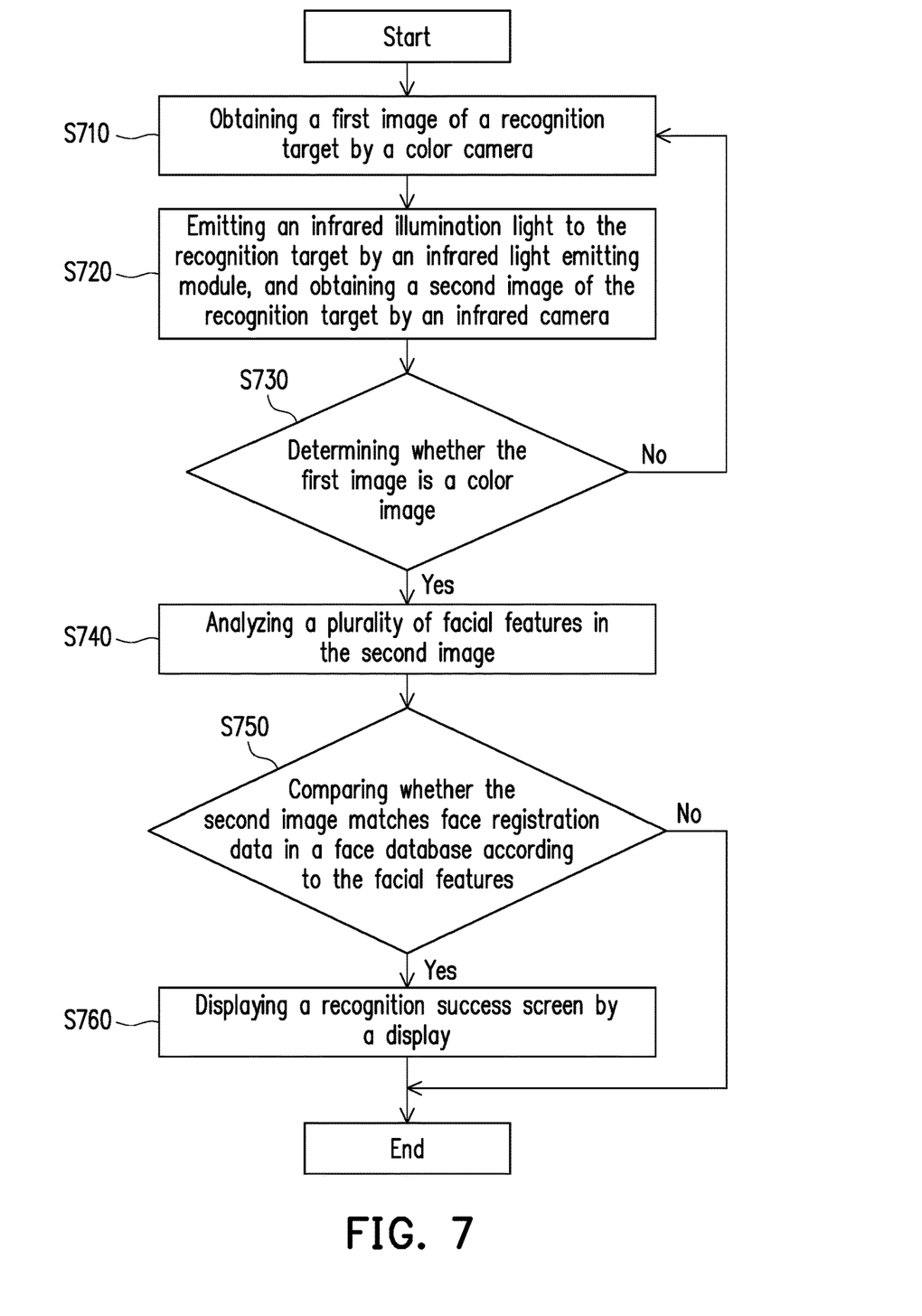
FIG. 7 is a flowchart of a face recognition method according to the second embodiment of the invention.

FIG. 6 is a schematic diagram of a face recognition device according to a second embodiment of the invention. FIG. 7 is a flowchart of a face recognition method according to the second embodiment of the invention. Referring to FIG. 6, a face recognition device 600 includes a processor 610, a color camera 621, an infrared camera 622 (i.e., the camera module 120 in the embodiment of FIG. 1 can further include the color camera and the infrared camera), a memory 630, an infrared light emitting module 640 and a display 650. The processor 610 is coupled to the color camera 621, the infrared camera 622, the memory 630, the infrared light emitting module 640 and the display 650. The memory 630 can store a face database. In this embodiment, the color camera 621 is configured to capture a recognition target 700 to obtain a first image. Also, when the infrared camera 622 captures the recognition target 700 to obtain a second image, the infrared light emitting module 640 can simultaneously emit an infrared illumination light to the recognition target 700 to illuminate the recognition target 700. In other words, the color camera 621 and the infrared camera 622 of the present embodiment can obtain the second image and the second image at different times or at the same time. Nonetheless, the invention does not limit the order of obtaining the first image and the second image.

Referring to FIG. 6 and FIG. 7 together, the face recognition device 600 of FIG. 6 can realize an anti-cracking face recognition function by executing steps S710 to S760 of FIG. 7. In step S710, the face recognition device 600 can obtain the first image of the recognition target 700 by the color camera 621. In step S720, the face recognition device 600 can emit the infrared illumination light to the recognition target 700 by the infrared light emitting module 640, and obtain the second image of the recognition target 700 by the infrared camera 622. It is worth noting that the order of executing steps S710 and S720 may be changed or be at the same time, and is not limited to the order of FIG. 6.

It should be noted that, if the recognition target 700 is the infrared photo instead of the real face, the color camera 621 will obtain the first image without colors (which may be, for example, a grayscale image). Conversely, if the recognition target 700 is the real face, the color camera 621 can obtain the first image with colors. Accordingly, in step S730, the processor can determine whether the first image is a color image. If not, it means that the recognition target 700 is not the real face, so the processor 310 re-executes step S710. If yes, it means that the recognition target 700 is the real face, so the processor 610 executes step S740. In step S740, the processor 610 analyzes the facial features in the second image to obtain a plurality of feature values of the facial features. In step S750, the processor 610 compares whether the second image matches the face registration data in the face database according to the feature values of the facial features, wherein the face database is stored in the memory 630 and read and executed by the processor 610. If not, the processor 610 ends the face recognition or re-execute step S710. If yes, the processor 610 executes step S760. In step S760, the display 650 can display a recognition success screen. Therefore, the face recognition device 600 and the face recognition method of this embodiment can effectively prevent others from cheating the processor 610 and passing verification of the face recognition by using the infrared photo instead of the real face for the infrared camera 622 to capture.

Moreover, in this embodiment, when a user operates the face recognition device 600 to perform the face recognition, the display 650 can display a dynamic image captured by the color camera 621 so that the user can properly adjust a face position for allowing the color camera 621 and the infrared camera 622 to effectively capture the face.

In summary, according to the face recognition device and the face recognition method of the invention, two face images can be obtained during the process of the face recognition and used to determine whether the recognition target is the real face and perform the face recognition, so as to realize the anti-cracking function.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A face recognition device, comprising:
an infrared light emitting module, configured to emit a first illumination light to a recognition target at a first time and emit a second illumination light to the recognition target at a second time, wherein a brightness of the first illumination light is higher than a brightness of the second illumination light;
a camera module, configured to obtain a first image of the recognition target at the first time and obtain a second image of the recognition target at the second time;
a processor, coupled to the camera module and the infrared light emitting module, and configured to analyze whether the first image meets an image condition to determine whether the recognition target is a real face; and
a memory, coupled to the processor, and configured to store a face database,
wherein when the processor determines that the first image meets the image condition, the processor analyzes a plurality of facial features in the second image, and the processor compares whether the second image matches face registration data in the face database according to the facial features to determine whether the second image passes recognition.

2. The face recognition device according to claim 1,
wherein the camera module comprises an infrared camera, and the infrared camera is configured to non-simultaneously obtain the first image and the second image,
wherein the infrared light emitting module simultaneously emits the first illumination light to the recognition target at the first time when the infrared camera obtains the first image, and the infrared light emitting module simultaneously emits the second illumination light to the recognition target at the second time when the infrared camera obtains the second image.

3. The face recognition device according to claim 2, wherein the image condition comprises that when a first facial feature quantity of the first image is less than a first threshold, the processor determines that the first image meets the image condition.

4. The face recognition device according to claim 2, wherein the image condition comprises that when a first facial feature quantity of the first image and a second facial feature quantity of the second image are different, the processor determines that the first image meets the image condition.

5. The face recognition device according to claim 2, wherein the image condition comprises that when a first facial feature quantity of the first image is greater than a second threshold, the processor determines that the first image does not meet the image condition.

6. The face recognition device according to claim 1,
wherein the camera module comprises a color camera and an infrared camera, the color camera is configured to obtain the first image, and the infrared camera is configured to obtain the second image,
wherein the infrared light emitting module simultaneously emits an infrared illumination light to the recognition target at the second time when the infrared camera obtains the second image.

7. The face recognition device according to claim 6, wherein the image condition comprises determining whether the first image is a color image.

8. The face recognition device according to claim 6, further comprising:
a display, coupled to the processor, and configured to display a dynamic image captured by the color camera.

9. The face recognition device according to claim 6, wherein the first image and the second image are obtained simultaneously.

10. A face recognition method, comprising:
emitting a first illumination light to a recognition target at a first time by an infrared light emitting module, and emitting a second illumination light to the recognition target at a second time by the infrared light emitting module, wherein a brightness of the first illumination light is higher than a brightness of the second illumination light;
obtaining a first image of the recognition target at the first time and obtaining a second image of the recognition target at the second time by a camera module;
analyzing whether the first image meets an image condition to determine whether the recognition target is a real face; and
when the first image meets the image condition, analyzing a plurality of facial features in the second image, and comparing whether the second image matches face registration data in a face database according to the facial features to determine whether the second image passes recognition.

11. The face recognition method according to claim 10, wherein the camera module comprises an infrared camera, and the face recognition method further comprises:
- simultaneously emitting the first illumination light to the recognition target at the first time by the infrared light emitting module when the infrared camera obtains the first image; and
- simultaneously emitting the second illumination light to the recognition target at the second time by the infrared light emitting module when the infrared camera obtains the second image.

12. The face recognition method according to claim 11, wherein the step of determining whether the first image meets the image condition comprises:
- determining that the first image meets the image condition when a first facial feature quantity of the first image is less than a first threshold.

13. The face recognition method according to claim 11, wherein the step of determining whether the first image meets the image condition comprises:
- determining that the first image meets the image condition when a first facial feature quantity of the first image and a second facial feature quantity of the second image are different.

14. The face recognition method according to claim 11, wherein the step of determining whether the first image meets the image condition comprises:
- determining that the first image does not meet the image condition when a first facial feature quantity of the first image is greater than a second threshold.

15. The face recognition method according to claim 10, wherein the camera module comprises a color camera and an infrared camera, the color camera is configured to obtain the first image, and the face recognition method further comprises:
- simultaneously emitting an infrared illumination light to the recognition target at the second time by the infrared light emitting module when the infrared camera obtains the second image.

16. The face recognition method according to claim 15, wherein the step of determining whether the first image meets the image condition comprises:
- determining whether the first image is a color image.

17. The face recognition method according to claim 16, further comprising:
- displaying, by a display, a dynamic image captured by the color camera.

18. The face recognition method according to claim 16, wherein the first image and the second image are obtained simultaneously.

* * * * *